United States Patent [19]

Dykstra et al.

[11] Patent Number: 4,945,626

[45] Date of Patent: Aug. 7, 1990

[54] SINGLE-PASS PALLET DISASSEMBLER WITH SELF-ADJUSTING HEAD

[75] Inventors: Gerald L. Dykstra, Wyoming; Craig Boogaard, Allendale; Rodley Brunsting, Hudsonville, all of Mich.

[73] Assignee: Industrial Resources of Michigan, Grand Rapids, Mich.

[21] Appl. No.: 391,953

[22] Filed: Aug. 9, 1989

[51] Int. Cl.$^5$ .............................................. B23P 19/04
[52] U.S. Cl. ....................................... 29/564.3; 29/239; 29/426.4; 83/477; 83/487; 83/943
[58] Field of Search ................. 29/564.3, 426.4, 426.5, 29/252, 239, 253; 83/943, 477, 477.1, 461, 487, 925 R

[56] References Cited

U.S. PATENT DOCUMENTS

| | | | |
|---|---|---|---|
| 3,771,209 | 11/1973 | Bennett, Jr. | 29/403 |
| 3,869,780 | 3/1975 | Ginnow et al. | 29/200 |
| 3,916,498 | 11/1975 | Lopez et al. | 29/200 |
| 3,991,459 | 11/1976 | Rapp | 29/252 |
| 4,089,098 | 5/1978 | DeMarco | 29/239 |
| 4,112,578 | 9/1978 | Sanford | 29/700 |
| 4,152,819 | 5/1979 | Conkle | 83/477.1 X |
| 4,241,495 | 12/1980 | Wakeem | 29/252 X |
| 4,320,570 | 3/1982 | Williams | 29/564.3 |
| 4,346,506 | 8/1982 | Martindale | 29/252 X |
| 4,392,403 | 7/1983 | Martindale | 29/426.4 |
| 4,435,892 | 3/1984 | Williams | 29/239 |
| 4,586,235 | 5/1986 | Benvenuto | 29/564.3 |
| 4,649,617 | 3/1987 | Hufnagel | 29/426.4 |
| 4,676,000 | 6/1987 | James | 29/426.4 X |
| 4,750,255 | 6/1988 | Hufnagel | 29/564.3 |
| 4,757,599 | 7/1988 | Bane | 29/564 |

Primary Examiner—William Briggs
Attorney, Agent, or Firm—Price, Heneveld, Cooper, DeWitt & Litton

[57] ABSTRACT

An apparatus for unnailing wood pallets includes a frame, a first cutter assembly and a second cutter assembly positioned vertically above the first. The first cutter assembly includes a pair of elongated horizontal support arms supporting a cutting head at one end, downwardly biasing springs at an opposite end and a pivot between the ends. The second cutter assembly includes a pair of elongated horizontal support arms supporting a second cutting head at one end and a pivot at an opposite end that is coaxial the pivot of the first cutter assembly. The second cutter assembly is biased upwardly by springs between its support arms and those of the first cutter assembly. A stringer return member is horizontally movable with a pallet-moving cradle and includes a member which is pivotally mounted to the cradle at one end and has a follower at an opposite end to follow a track that moves with the support arms in order to keep the member positioned between the pair of support arms. Each cutting head includes a pair of circular cutting blades having an outer portion that is hardened and a center portion that is left ductile. A sacrificial backing block on the pallet-moving cradle forces the pallet against the blades so that if any contact is made between the cradle and the blades, the sacrificial member, not the blades, will be damaged.

21 Claims, 7 Drawing Sheets

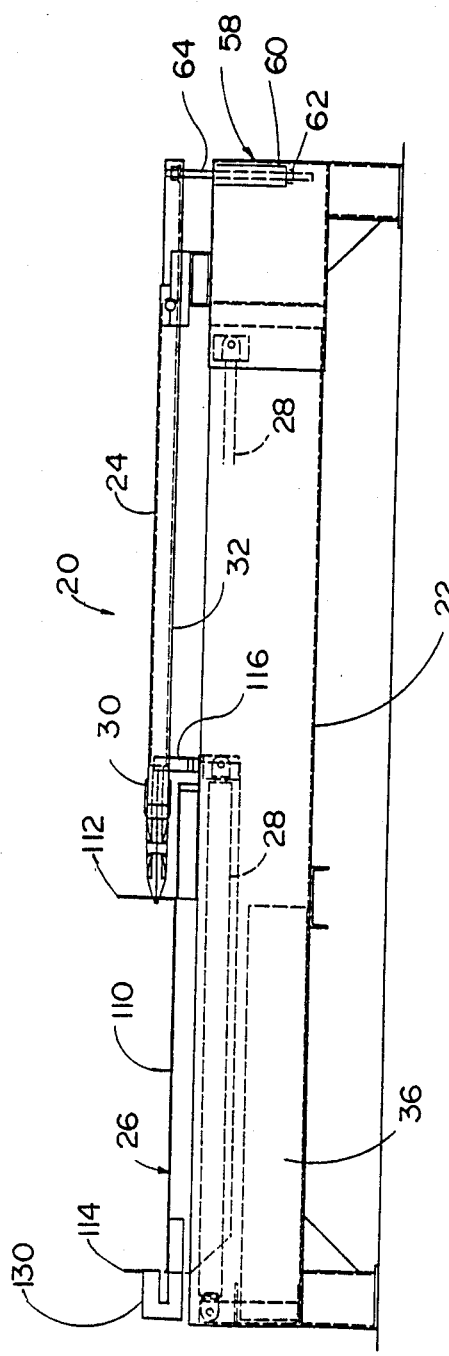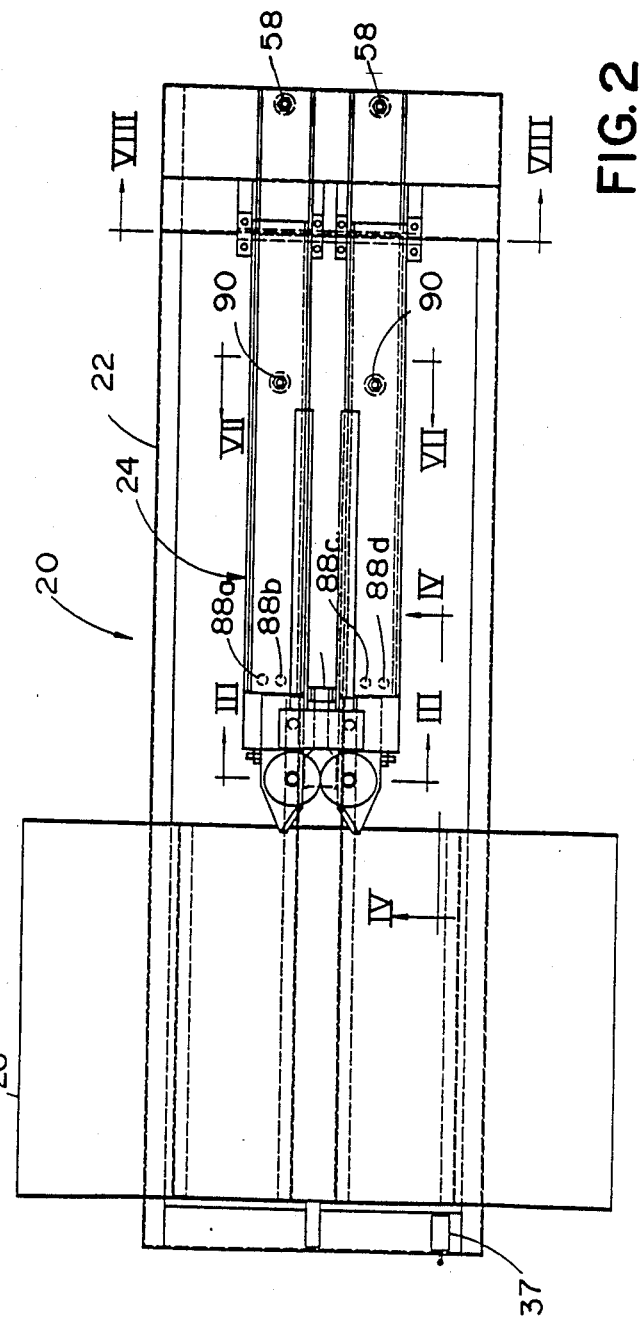

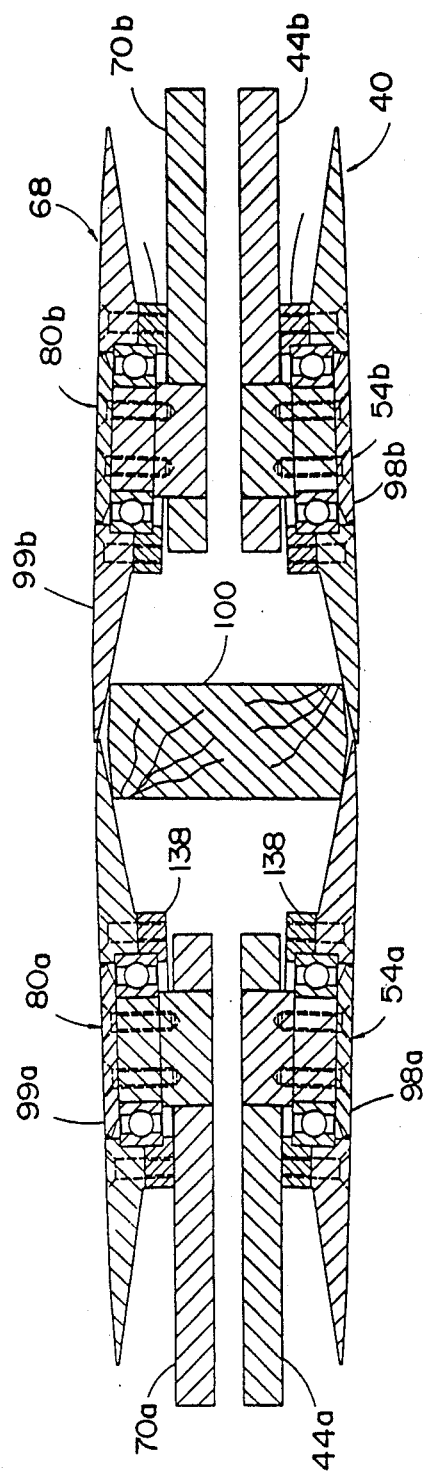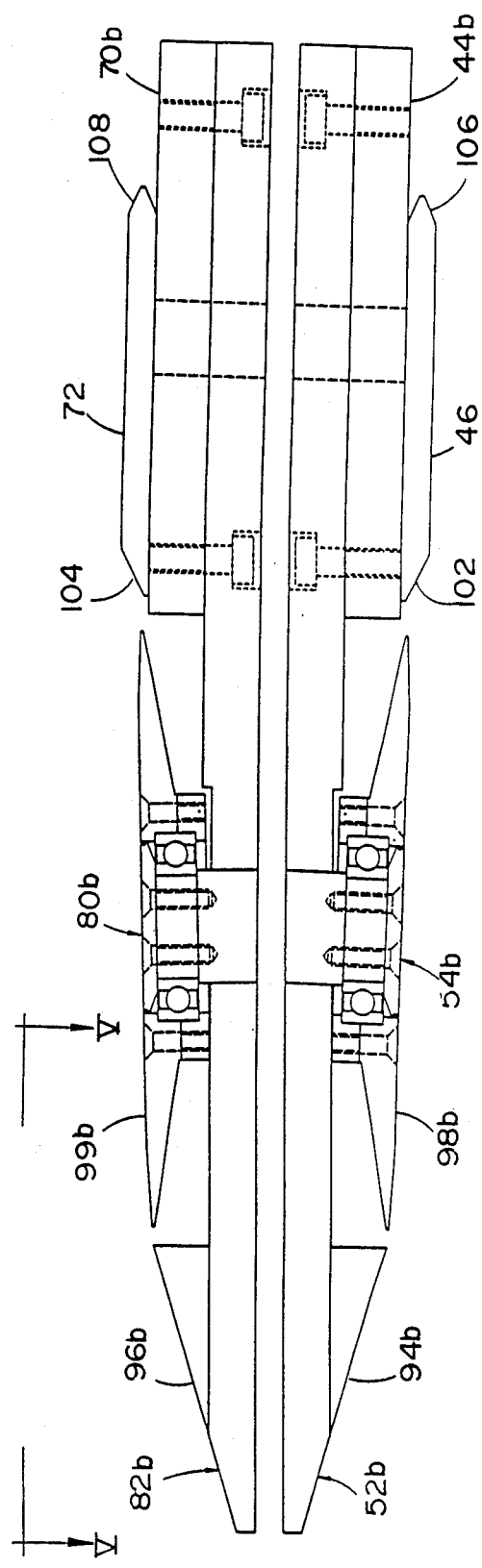

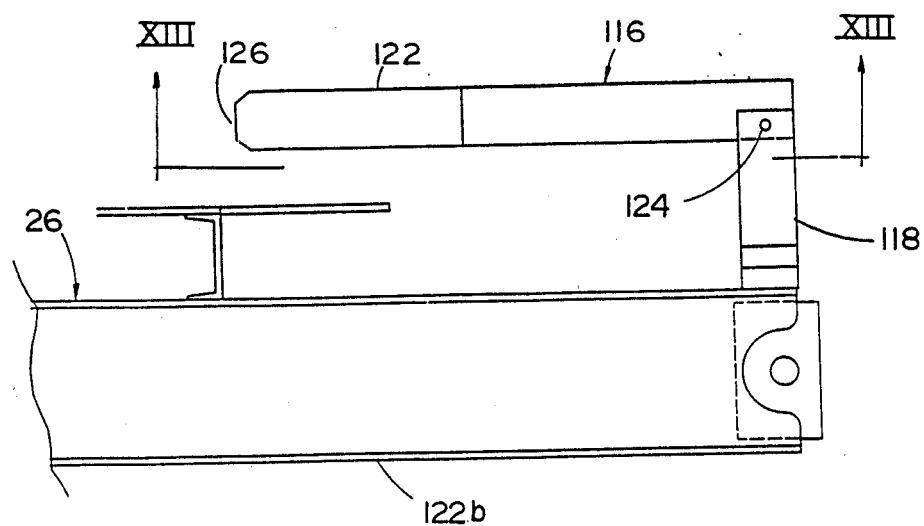
FIG. 11
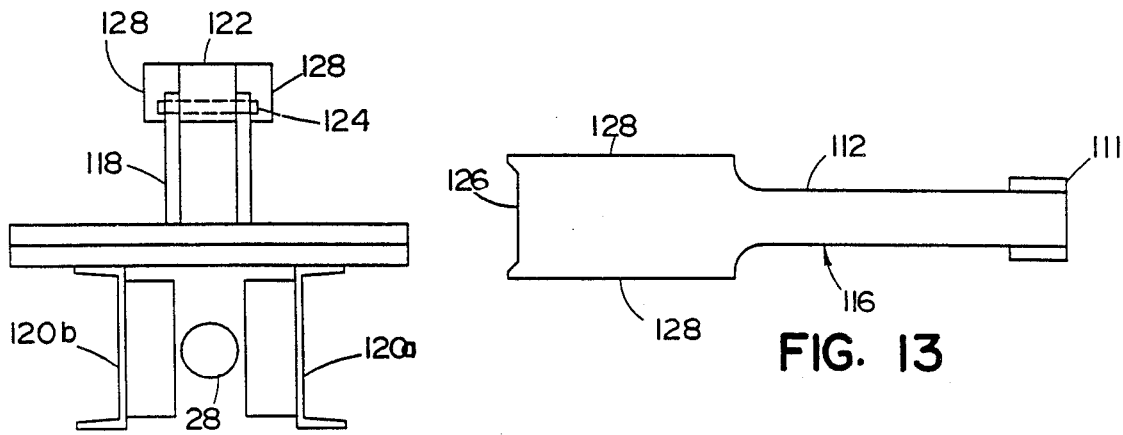
FIG. 12
FIG. 13
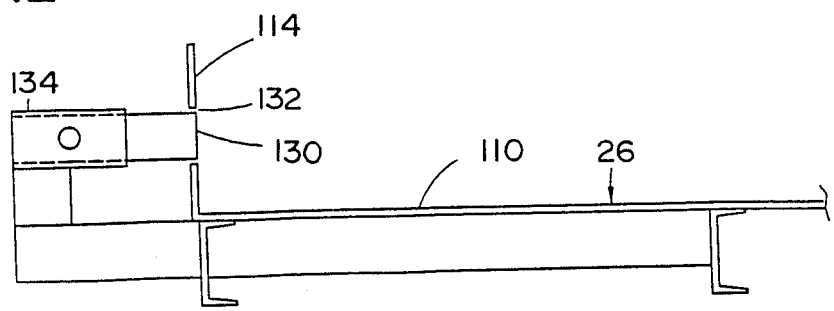
FIG. 14

SINGLE-PASS PALLET DISASSEMBLER WITH SELF-ADJUSTING HEAD

BACKGROUND OF THE INVENTION

This invention relates to an apparatus for disassembling a wooden article and is especially adapted for disassembling wooden pallets in order to replace broken boards. More particularly, the invention concerns an apparatus that is capable of breaking the nails between the slats and a supporting stringer on both sides of the stringer during a single pass through the apparatus.

U.S. Pat. No. 3,869,780 to Ginnow et al for an UN-NAILER discloses a practical apparatus for disassembling wooden pallets and includes a pair of free-rotating circular blades carried by an elongated support arm mounted at one end of a frame. A pallet is moved relative to the circular blades to effect cutting of the nails by the relative movement between the pallet and the blades. The support arms are side-by-side horizontal cantilevered arms. The complicated, failure-prone means for aligning the interface between the pallet slats and stringer in the Ginnow et al patent was replaced in subsequent designs by self-aligning means for aligning the cutting blades with the interface.

Because the Ginnow et al apparatus cuts the nails on one side of a stringer, six passes were required to completely disassemble a pallet. In Williams U.S. Pat. No. 4,320,570 and 4,435,892 for an apparatus and method of disassembling wooden pallets, three sets of side-by-side support arms and rotary cutting blades are positioned to simultaneously cut the nails on one side of three pallet stringers such that only two passes are required to disassemble a pallet. The Williams method and apparatus has met with limited success because of the complexity involved including the necessity for providing lateral adjustability to the support arms.

Other techniques, that deviate from the general approach suggested in the Ginnow et al patent, have been suggested in the prior art. For example, U.S. Pat. No. 4,241,495 issued to Wakeem for a METHOD AND APPARATUS FOR DISASSEMBLING WOODEN PALLETS, discloses three pair of motor-driven rotary cutters that are vertically applied to an on-end pallet. Each set of cutters includes positioning fingers for contacting the inner surface of the slats to guide the driven cutters into the space between the slats in the stringer. This patent not only requires lateral adjustment of the cutting heads to match the stringers, but provides motor-driven cutters with adjustable-length drive shafts to accommodate various stringer widths. Such complexities, which increase down-time, thwart the very goal of the design, which is to increase productivity.

In addition to difficulties in achieving increased productivity, other deficiencies in the basic Ginnow device remain. The cutting blades, which are an expensive item and require substantial machine down-time to replace, are prone to a catastrophic failure mode in which the severe stress of cutting hardened nails causes the blade to sever laterally into two or more pieces. In addition, the necessity of moving a pallet sufficiently forward across the blades in order to sever the nails for each slat, requires that a portion of the pallet-moving mechanism come perilously close to the blades, resulting in occasional metal-to-metal contact, which further damages the blades. Thus, the need exists for a pallet disassembler which provides enhanced productivity while improving reliability and durability.

SUMMARY OF THE INVENTION

The need for enhanced productivity and reliability in disassembling wooden pallets is met in an apparatus including first and second cutting means for cutting nails and means for causing relative horizontal movement between a wooden pallet and the first and second cutting means. A first support means is provided for supporting the first cutting means and a second support means is provided for supporting the second cutting means vertically above the first cutting means. Self-aligning guide means on each of the first and second support means guide the associated cutting means through the interface between a pallet stringer and one set of slats. An apparatus according to this aspect of the invention, severs the nails from both sides of a stringer simultaneously, reducing to three the number of passes to disassemble an entire pallet. Preferably, the first support means includes a first horizontal member with the first cutting means at one end and including means for biasing the opposite end downwardly. The first horizontal member is pivotably mounted to a frame at a location between the ends. The second support means includes an elongated second horizontal member having opposite first and second ends. The second cutting means is positioned at the first end and means are provided for pivotally mounting the member to the frame at an opposite end. Means are provided for biasing the first end upwardly.

One difficulty that is overcome, according to another aspect of the invention, is that of returning the stringer board along with the remaining portions of the pallet after passing the stringer between the first and second cutting means. Because of the self-aligning action provided by the guide means, any stationary member on the pallet moving means adapted to returning the stringer would be unworkable because it would jam the stringers and often contact the cutting means. Thus, according to this aspect of the invention, means are provided for returning the stringer with the rest of the pallet remains, including means that are movable with at least one of the supports for the cutting means that defines a track. A stringer return member having a surface for abutting a stringer and a follower for following the track is mounted to the pallet moving means such that the member horizontally moves with the pallet moving means and the follower is vertically adjustable in order to allow it to follow the track. In this manner, the stringer return member retains its position between the supports for the first and second cutting means while horizontally moving with the pallet moving means.

According to yet another aspect of the invention, catastrophic failure of rotary cutting blades in such a pallet disassembly apparatus is significantly reduced by providing cutting blades in which a hardening process is applied to the portion of the blade immediately adjacent the cutting edge while the central portion is left substantially unhardened. In this manner, the blade is able to absorb the stresses imparted by the unnailing process rather than catastrophically failing.

In yet another aspect of the present invention, blade damage is significantly reduced by providing a sacrificial member, which is itself nondamaging to the blades, at the portion of the pallet moving means that comes closest to the blades. Thus, when this portion of the pallet moving means does come into contact with the blades, only the sacrificial member will be damaged. The sacrificial member is relatively inexpensive and easy to replace and, therefore, provides a great advantage.

These and other related objects, advantages and features of this invention will become apparent upon review of the following specification in conjunction with the drawings.

DRAWINGS

FIG. 1 is a side elevation of an apparatus embodying the invention;

FIG. 2 is a top plan view of the apparatus in FIG. 1;

FIG. 3 is a sectional view taken along the lines III—III in FIG. 2;

FIG. 4 is a partial side elevation taken along the lines IV—IV in FIG. 2;

FIG. 11 is a partial side elevation of a stringer return assembly embodying the present invention;

FIG. 12 is an end elevation taken from the direction XII in FIG. 11;

FIG. 13 is a bottom plan view taken along the lines XIII—XIII in FIG. 11;

FIG. 14 is a side elevation of a pallet cradle including a sacrificial backup block embodying the present invention;

DESCRIPTION OF THE PREFERRED EMBODIMENT

Figure 5:
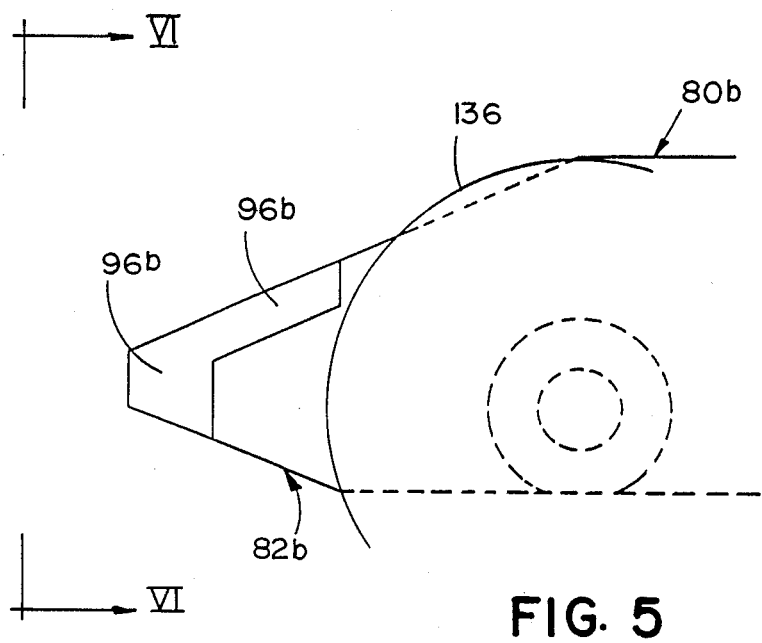
FIG. 5 is a partial plan view taken along the lines V—V in FIG. 4.
Figure 6:
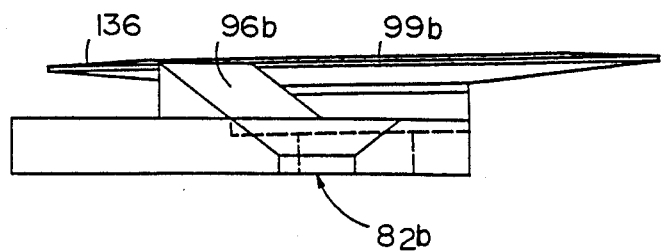
FIG. 6 is a partial end elevation taken along the lines VI—VI in FIG. 5.

Referring now specifically to the drawings, and the illustrative embodiments depicted therein, a pallet disassembler 20 includes a frame 22, an elongated cutting head assembly 24 and pallet moving means including a pallet support cradle 26 and propulsion means, such as a hydraulic cylinder 28 (FIGS. 1 and 2). Cutting head assembly 24 includes an upper arm assembly 30 and a lower arm assembly 32, both of which are, in the illustrated embodiment, pivotally mounted to frame 22 about a common pivot axis 34. The space under head 24 forward of pivot axis 34 (to the left, as viewed in FIG. 1) is unobstructed such that pallet support cradle 26 is movable from a first, retracted position illustrated in FIG. 1 to a second, extended position under head assembly 24 by the extension of hydraulic cylinder 28. Cradle 26 is guided in this movement by lateral wheels (not shown) operating in guides (not shown) formed in the sides of frame 22. Pallet disassembler 20 further includes a hydraulic oil reservoir 36 and appropriate hydraulic controls 37.

Figure 9:
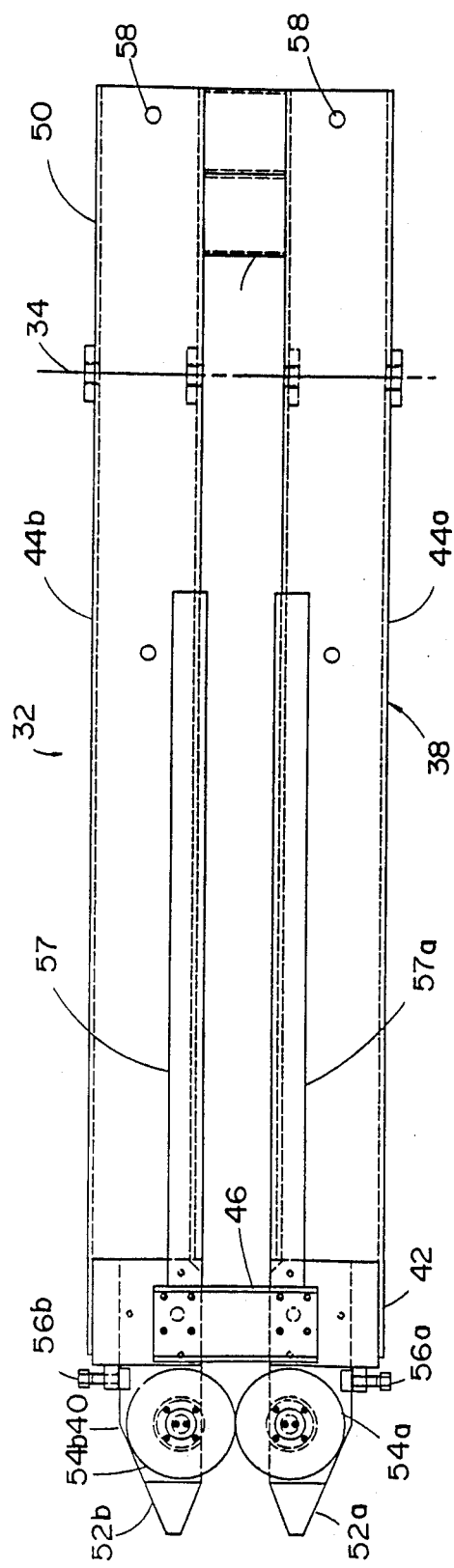
FIG. 9 is a bottom plan view of the lower cutting head assembly.

Lower arm assembly 32 includes an elongated support member, generally illustrated as 38, and cutting means 40 positioned at end portion 42 of the support member (FIG. 9). Support member 38 is made from mirror-image support arms 44a and 44b, which are rigidly interconnected at end portion 42 by a bridge plate 46 and at an opposite end portion 50 by a second bridge plate 48. Chamfered nose portions 52a, 52b, which extend forwardly at end portion 42, provide means for aligning the cutting means 40 with the interface between a stringer 100 and a set of slats on a pallet, as will be set forth in more detail below and as illustrated in FIG. 3. Cutting means 40 includes a pair of free-rotating cutting blade assemblies 54a, 54b whose circular cutting edges slightly overlap. Adjustability of blade assemblies 54a, 54b is provided by lateral adjustment means 56a, 56b. Elongated guide rails 58a, 58b are welded to a lower surface of support arms 44a, 44b for a purpose that will be set forth in more detail below. An upward bias is imparted to the cutting end portion 42 of lower arm assembly 32 by downwardly extending biasing means 58 which bias end portion 50 toward frame 22 (FIG. 1). In the illustrated embodiment, biasing means 58 includes a pair of compression springs 60, each having an 800 pound rating, and adjustable mounting means, including a nut 62, threadably engaging bolt 64 extending from portion 50. The bias is preferably adjusted to provide a 30 pound net downward bias to end portion 42.

Figure 10:
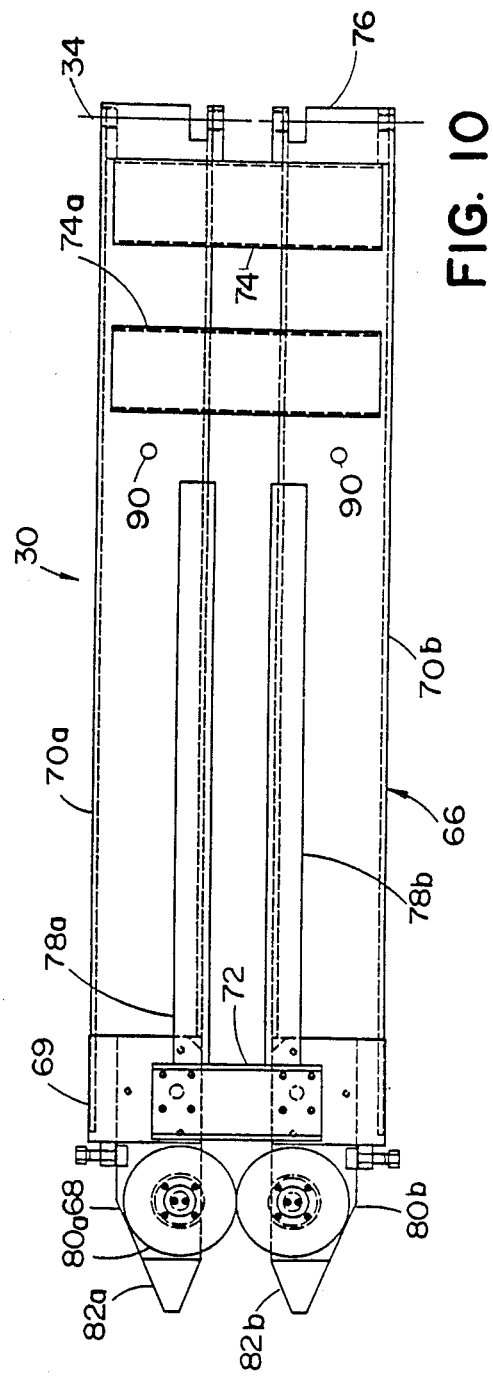
FIG. 10 is a top plan view of the upper cutting head portion.

By reference to the FIG. 10, upper arm assembly 30 includes elongated upper support member 66 and upper cutting means 68 positioned at end portion 69 of the support member. Support member 66 includes a pair of mirror-image support arms 70a, 70b rigidly interconnected by forward bridge plate 72 and rearward bridge plates 74a, 74b. Pivot 34 is located at an end portion 76 of upper arm assembly 30 that is opposite the cutting end portion 69. A pair of guide rails 78a, 78b are welded to an upper surface of support arms 70a, 70b and cooperate with guide rails 58a, 58b in a manner that will be set forth below. Cutting means 68 are identical with cutting means 40 on the lower arm assembly and include free-rotating cutting blade assemblies 80a, 80b. Upper arm assembly 32 additionally includes nose portions 82a, 82b defined by a chamfered, tapered portion of support arms 70a, 70b.

Figure 7:
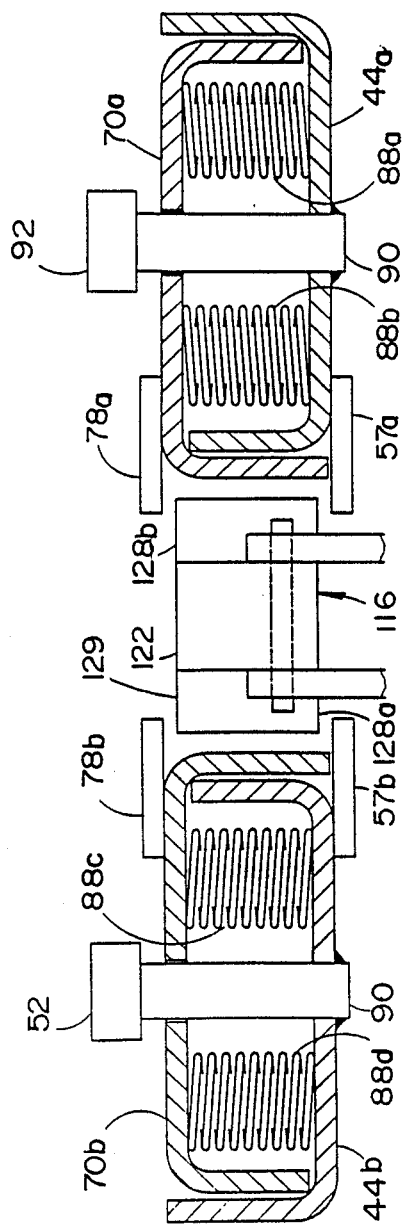
FIG. 7 is a sectional view taken along the lines VII—VII in FIG. 2.
Figure 8:
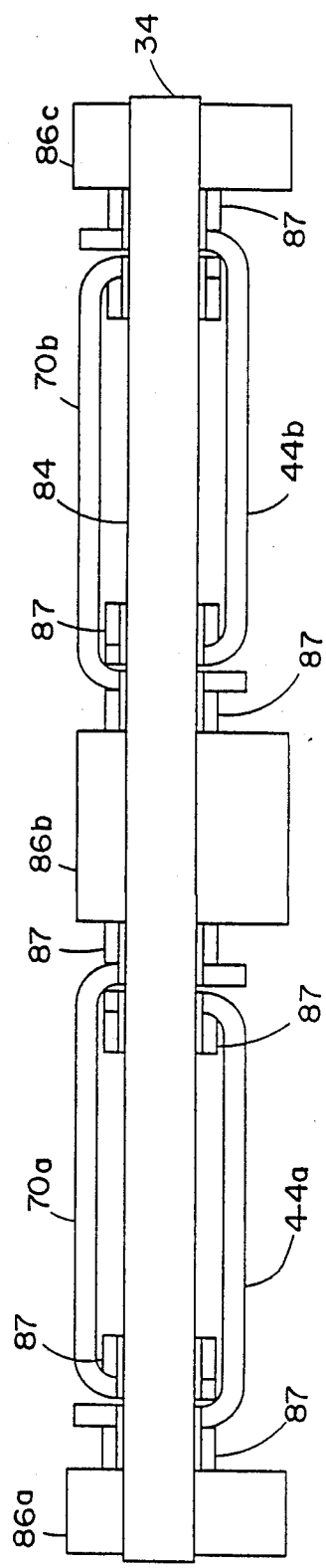
FIG. 8 is a sectional view taken along the lines VII—VII in FIG. 2.

The structural relationship between upper arm assembly 30 and lower arm assembly 32 may be better understood by reference to FIGS. 7 and 8, in which it may be seen that each support arm 44a, 44b, 70a, 70b is a channel member. Upper support arms 70a, 70b are inverted and laterally offset from lower arms 44a, 44b such that the upper and lower arms may nest together and pivot about common pivot axis 34. The pivot means at 34 includes a steel shaft 84 supported by blocks 86a, 86b, 86c and bushings 87 welded to lateral sides of each support arm. An upward bias is provided to the cutting end portion 69 of upper arm assembly 30 by head springs 88a, 88b positioned between the support arms 44a and 70a, and head springs 88c, 88d positioned between support arms 44b and 70b. The head springs 88a–88d are positioned at end portion 69, which is the end of the cutting head assembly that is opposite the pivot. Thus, a greater upward force may be provided to cutting end portion 69 by smaller springs. In addition, the location of the head springs 88a–88d between the upper and lower support arms provides shielding from damage caused by the pallet disassembly process. Restraining bolts 90a, 90b welded to upper support arms 70a, 70b and extending through openings in lower support arms 44a, 44b, threadably receive adjustment nuts 92a, 92b in order to provide constraint on the amount of upward travel of the upper support arms 70a, 70b with respect to the lower supports arms 44a, 44b. Adjustment nut 92 provides for adjustment of the travel limit and, when removed, additionally allows separation of the support arms to provide access to head springs 88a–88d. In a preferred embodiment, head springs 88a–88d are preselected to provide a net 30 pound upward bias to cutting end portion 69 of upper arm assembly 30.

Nose portions 52a, 52b include downward, rearwardly sloping surfaces 94a, 94b and end nose portions 82a, 82b include upward, rearwardly sloping surfaces 96a, 96b (FIG. 4). Blade assemblies 54a, 54b include substantially planar lower surfaces 98a, 98b that are aligned with the trailing edges of sloping surfaces 94a, 94b. Likewise, upper cutting blade assemblies 80a, 80b include substantially planar upper surfaces 99a, 99b that are aligned with the trailing edges of sloping surface 96a, 96b. In this manner, nose portions 52a; 52b guide the cutting edges of cutting blade assemblies 54a, 54b to the interface between a stringer 100 and the bottom slats (not shown) and nose portions 82a, 82b guide cutting assemblies 80a, 80b to the interface between stringer 100 and the upper slats of the pallet (not shown).

Bridge plates 46, 72 include chamfered leading edges 102, 104 and double-beveled trailing edges 106, 108, respectively (FIG. 4). The purpose of leading chamfered edges 102, 104 is to guide the denailed slats away from the stringer as the pallet is progressively moved along cutting head assembly 24. The purpose of double beveled trailing edges 106 and 108 is important to the return stroke during which the denailed stringer, which is now separate from the pallet, is being returned to the initial position of the cradle illustrated in FIG. 1, along with the remaining portions of the pallet. It has been discovered that, if the trailing surface of bridge plates 46, 72 are chamfered in the same manner as the leading surface 102, 104, certain difficulties arise. A common form of pallet includes notched surfaces on the stringers in order to allow a forklift to approach the pallet from all four sides. When such a pallet is disassembled and such a notch approaches the bridge plate during the return stroke, there is a tendency for the stringer to offset in the direction of the notch. The double-beveled trailing surfaces 106, 108 guide the stringer back into the space between the support arms to prevent the notches in the stringers from jamming the bridge plates and shutting down the apparatus.

Pallet support cradle 26 includes a bed plate 110 and forward and rear plates 112, 114, respectively. During the forward stroke, rear plate 114 exerts a forward thrust on the pallet against cutting head assembly 24. Upon completion of the forward stroke, front plate 112 returns most of the disassembled pieces of the pallet to the position illustrated in FIG. 1. However, front and rear plates 112, 114 must be open in the center in order to allow the cutting head to traverse the front and rear plates. During the return stroke of the pallet cradle 26, this opening in front plate 112 prevents the front plate from returning the stringer to the position illustrated in FIG. 1. In order to return the stringer with the remaining portions of the disassembled pallet, a stringer return means 116 is provided.

By reference to FIGS. 7 and 11–13, stringer return means 116 includes a vertical support 118 which is attached at its lower end to center beam members 120a, 120b of cradle 26. Center beam members 120a, 120b provide a point for attachment of support deck 110 and hydraulic cylinder 28 to the cradle. A stringer return arm 122 is pivotally mounted at 124 to an upper portion of support 118 by means such as a shear-pin. Stringer return arm 122 includes a forward-facing surface 126 at an opposite end from support 118 and laterally extending side portions 128a, 128b adjacent surface 126. Side portions 128a, 128b are configured for positioning within a space 129 defined between guide rail members 57a, 57b and 78a, 78b (FIG. 7). Because stringer return arm 122 is pivotably mounted to support 118, side portions 128a, 128b are followers which follow the relative movement of upper and lower arm assemblies 30, 32 and thus position forward-facing surface 126 between the arm assemblies. Stringer return arm 112 is made from ultra-high molecular weight polymer (UMWP) which is selected because of its self-lubricating properties. This material is also preferred because stringer return arm 122 will be passing repeatedly between the cutting blade assemblies, any inadvertent contact between the arm and the cutting blades will typically cause minor damage to the stringer return arm but no damage to the blade assemblies. Even an occasional failure of the stringer return arm can be readily fixed at a relatively low cost.

By reference to FIG. 14, pallet cradle 26 additionally includes a backup block 130 which extends forwardly through an opening 132 in rear plate 114. Backup block 130 is positioned within opening 132 by a bracket assembly 134 extending upwardly from under bed 110 of the cradle. Backup block 130 is a sacrificial member made from a material preselected to be damaged by, rather than cause damage to, the blade assemblies. As cradle 26 is thrust fully forward in order to sever the rearmost slat of the pallet, a portion of the cradle must be thrust very close to the blade assemblies. Backup block 130 is positioned at the portion of the cradle that comes closest to the blade assemblies so that if any part contacts the blades, it will be the backup block. In the illustrated embodiment, backup block 130 is made from UMWP and is attached to cradle assembly 26 in a manner to be easily replaceable.

Figure 15:
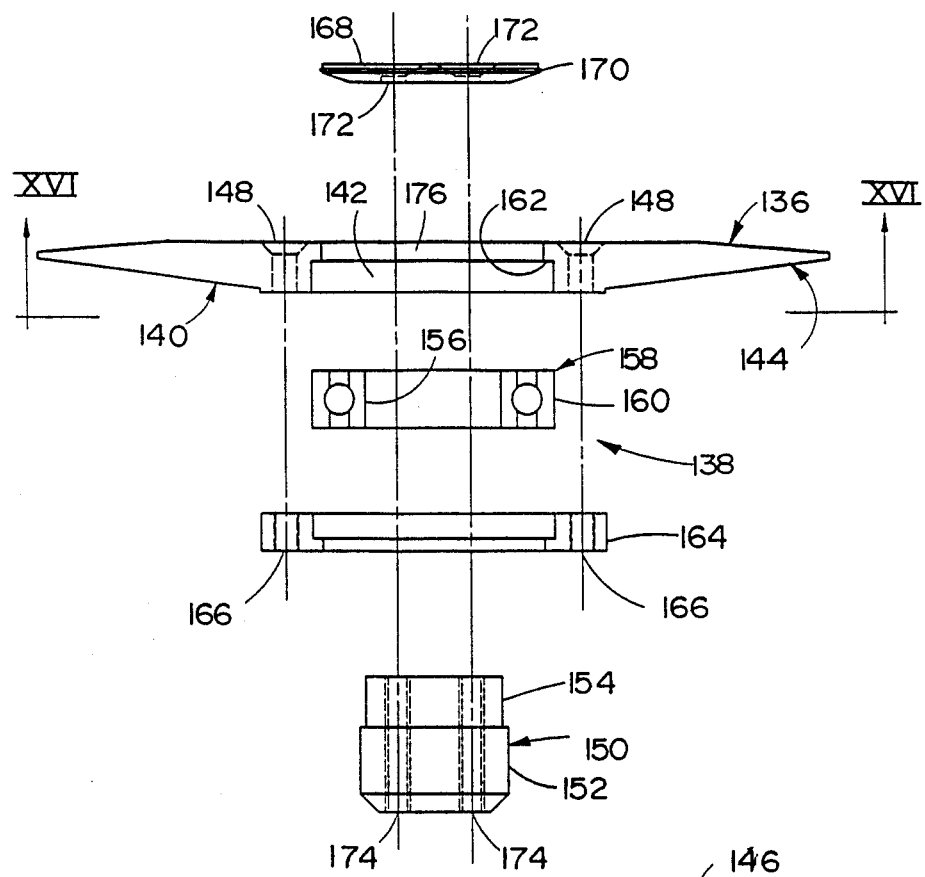
FIG. 15 is a sectioned elevation of a blade assembly embodying the present invention.
Figure 16:
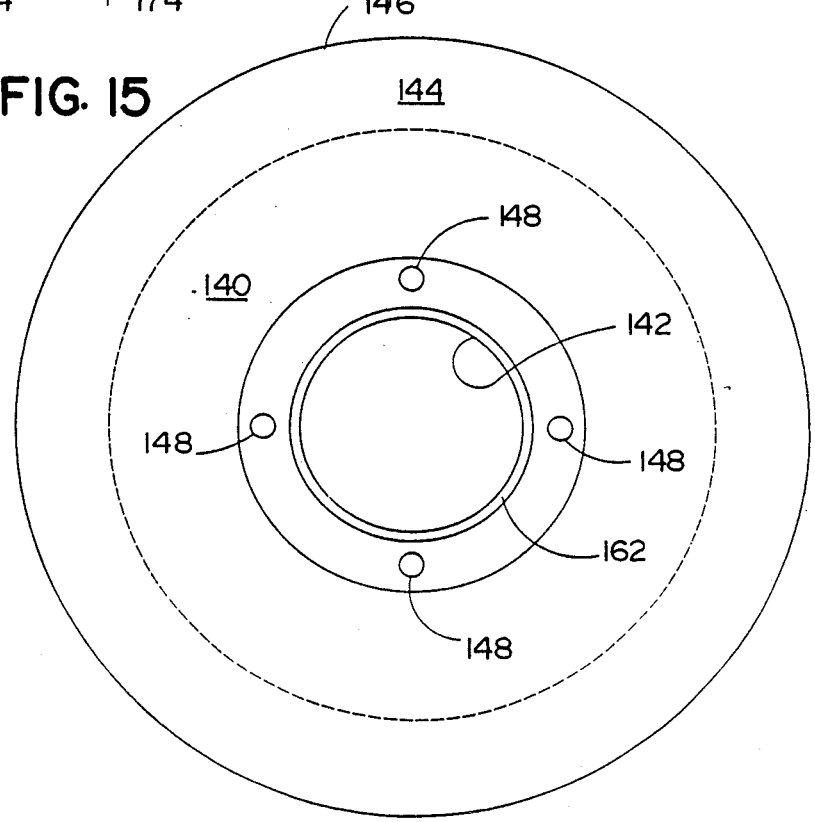
FIG. 16 is a bottom plan view taken along the lines XVI—XVI in FIG. 15.

Each blade assembly 54a, 54b, 80a, 80b includes a circular cutting blade 136 and free-rotating mounting means, generally illustrated as 138, for mounting the cutting blade to the respective support arm (FIGS. 3, 15 and 16). Each cutting blade 136 includes an inner portion 140 including a central hole 142 extending through the blade. A plurality of countersunk fastener openings 148 are distributed around hole 140. Each cutting blade 136 additionally includes an outer portion 144 which defines a cutting edge 146. Mounting means 138 includes a spindle 150 having an enlarged portion 152 dimensioned to provide an interference fit with an opening in the respective support arm. Spindle 150 additionally includes a narrow portion 154 which is dimensioned to provide an interference fit with the inner race 156 of a bearing 158. An outer race 160 of bearing 158 is captured between a flange 162 defined around opening 142 and a retainer 164. Thus, with spindle portion 152 press-fit into its corresponding support arm, with spindle portion 154 press-fit into inner race 156 and with fasteners (not shown) extending through countersunk openings 148 in blade 136 and extending into openings 166 in retainer 164, blade 136 is firmly rotatably mounted to its corresponding support arm. As best seen by reference to FIGS. 3 and 4, cutting assemblies 54a,

54*b*, 80*a*, 80*b* are mounted with a slight cant laterally and forwardly of 2.5°.

A retainer cap 168 includes an inwardly extending outer groove for receiving an O-ring 170 or other like sealing means. With fasteners (not shown) extending through openings 172 in retainer cap 168 and received in openings 174 in spindle 150, retainer cap 168 is positioned within a narrow portion 176 of hole 142. With O-ring 170 sealing the interface between blade 136 and retainer cap 168, the retainer cap will serve to retain grease in the space surrounding the races of bearing 158 while minimizing the amount of wood particles entering the bearing which may cause damage thereto. Thus, while not completely eliminating damage to bearings 158, the illustrated mounting means substantially extends the life expectancy of such bearings.

Cutting blade 136 is not uniformly hardened as is conventional in the pallet disassembly art. Rather, only outer portion 144 is hardened and inner portion 140 is left unhardened and is, therefore, ductile. It has been discovered that this arrangement significantly reduces the tendency of such cutting blades to experience catastrophic failure that occurs in prior blades that are hardened throughout. In fact, while a slight reduction in the useful life of a ground edge 146 is experienced, no blade made in this fashion has yet experienced a catastrophic failure during a trial period that would have produced several such failures in the prior fully-hardened blades. Because the edge 146 may be readily restored by grinding, the significant reduction in catastrophic failures is a vast improvement. In the illustrated embodiment, blade 136 is made from 4140 steel that is flame-hardened for approximately one inch of its outer perimeter to a 58–60 Rockwell hardness.

In operation, with a pallet placed on cradle 26 and a stringer 100 generally laterally aligned with cutting head 24, hydraulic controls 37 are actuated to cause cylinder 28 to fully extend. As contact is made between the pallet and the cutting head, nose portions 52*a*, 52*b*, 82*a*, 82*b* cause the upper and lower arm assemblies to vertically adjust and align the cutting plane of blade assemblies 54*a*, 54*b*, 80*a*, 80*b* with the interface between stringer 100 and the upper and lower slats. In the illustrated embodiment, sufficient self-aligning capability is provided to accommodate stringers from 3–4½" in height and slats from ½ to 1½" in thickness. As the pallet passes over the cutting blades, the leading edges 102, 104 of bridge plates 46, 72 cause the slats to expand away from the stringer. When the cylinder 28 is fully extended, backup block 130 will extend in the area adjacent the cutting blades and thrust the pallet fully beyond the cutting blades. When the operator actuates controls to withdraw cradle 26, front surface 126 of stringer return arm 122 will retrieve the stringer from the area 129 between the support arms under the horizontal thrust provided by support 118 through pivot 124. Side portions 128*a* will guide stringer return arm 122 forwardly between the cutting blade assemblies to avoid jamming and damage. As the stringer engages bridge plates 46 and 72, double bevel trailing edges 106 and 108 guide the stringer towards the area between the support arms to avoid jamming. By returning the stringer along with the remaining portions of the disassembled or partially-disassembled pallet, an operator standing at one end of the apparatus may load the apparatus with pallets and remove all of the pallet components with little motion.

Because the nails on both sides of a stringer are simultaneously cut in a single pass through the disassembler 48, an entire pallet may be disassembled with three passes versus the traditional six passes required by conventional pallet disassemblers. In addition, the present invention avoids the complicated mechanisms provided by prior attempts to enhance productivity and, further, eliminates many of the failure-prone structures of even relatively simple prior art machines. Furthermore, the present apparatus is less prone to jamming and, when such jamming does occur, the apparatus is configured to avoid damage to critical components.

The present invention provides self-alignment with both the upper and lower slats through a pivotal motion which provides durability. By pivoting upper and lower arm assemblies about a common pivot that is spaced a large distance from the cutting blades, the vertical movement of the cutting blades, as they self-align, does not result in substantial angular displacement of the cutting blade axis and thus eliminates a source of board gouging.

Changes and modifications in the specifically described embodiments can be carried out without departing from the principles of the invention which is intended to be limited only by the scope of the appended claims, as interpreted according to the principles of patent law including the doctrine of equivalents.

The embodiments of the invention in which an exclusive property or privilege is claimed are defined as follows.

1. An apparatus for unnailing wood pallets having first and second spaced sets of slats nailed to opposite sides of a plurality of wood stringers, said apparatus comprising:

a frame;

a first arm assembly including an elongated horizontal first member having opposite first and second end portions and first cutting means at said first end portion thereof for cutting nails, said first arm assembly further including pivot means for pivotally mounting a portion of said first member between said opposite end portions to an end of said frame to pivot about a horizontal axis and biasing means for biasing said second end portion thereof downwardly;

a second arm assembly including an elongated horizontal second member having opposite first and second end portions and second cutting means at said first end portion thereof for cutting nails, said second cutting means positioned vertically above said first cutting means, said second arm assembly further including second pivot means for pivotally mounting said second end portion of said second member to said end of said frame to pivot about a horizontal axis and biasing means for biasing said first end portion thereof upwardly;

guide means on said first end portions of said first and second members for guiding said first and second cutting means to opposite interfaces between a pallet stringer and the first and second associated sets of slats; and pallet moving means mounted to said frame for moving a pallet horizontally in the direction of said first and second arm assemblies.

2. The apparatus in claim 1 in which said first and second pivot means are positioned to mount said first and second members to pivot about a common axis.

3. The apparatus in claim 1 in which said first biasing means includes a tension spring extending between said second end portion of said first member and said frame.

4. The apparatus in claim 1 in which said second biasing means includes a compression spring extending between said first end portions of said first and second members.

5. The apparatus in claim 4 further including means for limiting the separation of said first end portions 6. The apparatus in claim 1 in which said guide means includes an outwardly downwardly sloping surface on said first member and an outwardly upwardly sloping surface on said second member.

7. The apparatus in claim 1 further including stringer return means positioned between said first and second members and attached to said pallet support means for moving a stringer in a direction away from said first and second members.

8. An apparatus for unnailing wood pallets having first and second spaced sets of slats nailed to opposite sides of a plurality of wood stringers, said apparatus comprising:
   a frame;
   a lower arm assembly including a pair of generally horizontal laterally spaced elongated first arms, first connecting means for rigidly interconnecting said first arms, first circular blades positioned horizontally on one end of said first arms in a manner that said blades overlap in a shearing fashion, first biasing means for biasing downwardly an end of said first arms opposite said first ends, pivot means between said ends of said first arms for mounting said lower arm assembly to said frame to pivot about a horizontal axis, and guide means at said first ends of said first arms for guiding said first circular blades to an interface between a stringer and a set of slats;
   an upper arm assembly above said lower arm assembly and including a pair of generally horizontal laterally spaced elongated second arms, second connecting means for rigidly interconnecting said second arms, second circular blades positioned horizontally on one end of said second arms above said first circular blades, second pivot means at an end of said second arms opposite said first ends thereof for mounting said upper arm assembly to pivot about said axis, biasing means between each of said first arms and the juxtaposed one of said second arms for biasing said first ends of said arms apart, and guide means at said first ends of said second arms for guiding said second circular blades to an interface between a stringer and a set of slats;
   a pallet support cradle horizontally movable on said frame between a first position away from said arm assemblies and a second position under said arm assemblies, said support cradle including a horizontal surface and opposite end surfaces generally perpendicular to said first and second arms; and
   means for moving said pallet support cradle between said first and second positions.

9. The apparatus in claim 8 further including means for limiting the separation of said upper and lower arm assemblies.

10. The apparatus in claim 8 further including stringer return means for moving a stringer from said second position to said first position, said stringer return means including track means defining a track between said upper and lower arm assemblies and a ram member horizontally movable with said pallet support cradle and including a portion guided along said track.

11. The apparatus in claim 10 in which said track means includes aligned facing surface members on said first and second arms defining a passage between said surface members.

12. The apparatus in claim 11 in which said ram member includes a first portion in said passage between said surface members and a second portion pivotally mounted to said pallet support cradle.

13. The apparatus in claim 8 in which said pallet support cradle includes a sacrificial member adjacent said first and second circular blades when said cradle is in said second position, said sacrificial member selected to be substantially nondamaging to said blades.

14. The apparatus in claim 8 in which each of said first and second blades is made from steel and has an inner portion adjacent its center and an outer portion adjacent its cutting edge and wherein said outer portion is harder than said inner portion.

15. The apparatus in claim 8 in which each of said first and second blades includes means defining a center hole therein, said first and second blades being mounted to the associated one of said first and second arms by rotatable mounting means, said rotatable mounting means including a spindle, a bearing having an outer race and an inner race, means for fastening said inner race to said spindle, means for fastening said outer race to said blade, cover means for closing said center hole and means for fastening said cover means to said spindle.

16. The apparatus in claim 8 in which each said first and second connecting means includes a plate spanning the associated pair of said arms adjacent the associated said blades, said plate having a chamfered leading edge and a double-beveled trailing edge.

17. An apparatus for unnailing wood pallets having first and second spaced sets of slats nailed to opposite sides of a plurality of wood stringers, said apparatus comprising:
   first arm assembly having first cutting means for cutting nails and horizontally elongated support means for supporting said first cutting means;
   second arm assembly having second cutting means for cutting nails and horizontally elongated support means for supporting said second cutting means;
   means movable with at least one of said first and second support means for defining a track;
   a pallet moving means for moving a pallet between a first position away from said arm assemblies and a second position subjacent said arm assemblies;
   a stringer return means for moving a stringer from said second position to said first position, said stringer return means including a member having surface means for abutting a stringer, follower means for following said track and mounting means for mounting said member to said pallet moving means such that said member horizontally moves with said pallet moving means and said follower means is vertically adjustable.

18. The apparatus in claim 17 in which said member is elongated and wherein said surface means is at one end of said elongated member, wherein said follower means is adjacent said surface means and further wherein said mounting means includes means for pivotally mounting a second end of said elongated member opposite said one end to said pallet moving means.

19. The apparatus in claim 18 in which said track includes first guide surface means along said first support means and second guide surface means along said second support means and facing said first guide surface means such that said first and second guide surface means defining a space therebetween.

20. The apparatus in claim 19 in which said follower means includes a widened portion of said member configured to fit said space between said first and second surface means.

21. The apparatus in claim 20 in which said member is made from a polymer.

* * * * *